United States Patent

Salonikios

(10) Patent No.: US 8,819,266 B2
(45) Date of Patent: Aug. 26, 2014

(54) DYNAMIC FILE TRANSFER SCHEDULING AND SERVER MESSAGING

(75) Inventor: Stamos D. Salonikios, Rocky Hill, CT (US)

(73) Assignee: Hartford Fire Insurance Company, Hartford, CT (US)

(*) Notice: Subject to any disclaimer, the term of this patent is extended or adjusted under 35 U.S.C. 154(b) by 981 days.

(21) Appl. No.: 12/125,657

(22) Filed: May 22, 2008

(65) Prior Publication Data

US 2009/0292790 A1  Nov. 26, 2009

(51) Int. Cl.
*G06F 15/16* (2006.01)
*G06F 17/30* (2006.01)

(52) U.S. Cl.
CPC .............. *G06F 17/30067* (2013.01)
USPC ............. 709/232; 709/217; 709/233

(58) Field of Classification Search
USPC ........................................ 709/217
See application file for complete search history.

(56) References Cited

U.S. PATENT DOCUMENTS

| | | | |
|---|---|---|---|
| 4,642,758 A | 2/1987 | Teng | |
| 5,327,559 A | 7/1994 | Priven et al. | |
| 5,881,283 A | 3/1999 | Hondou et al. | |
| 6,493,680 B2 | 12/2002 | Logan et al. | |
| 6,622,151 B1* | 9/2003 | Hamamoto et al. | 709/232 |
| 6,769,120 B1* | 7/2004 | Rodriguez | 718/100 |
| 6,918,089 B2* | 7/2005 | Uchida et al. | 715/751 |
| 2002/0023140 A1* | 2/2002 | Hile et al. | 709/217 |
| 2002/0184224 A1* | 12/2002 | Haff et al. | 707/10 |
| 2004/0153567 A1* | 8/2004 | Lichtenstein | 709/235 |
| 2005/0091269 A1* | 4/2005 | Gerber et al. | 707/103 X |
| 2005/0102254 A1 | 5/2005 | Marr et al. | |
| 2005/0234739 A1* | 10/2005 | Schoenberg | 705/2 |
| 2006/0248165 A1* | 11/2006 | Sridhar et al. | 709/218 |
| 2007/0043874 A1 | 2/2007 | Nath et al. | |
| 2007/0143499 A1* | 6/2007 | Chang | 709/245 |
| 2008/0235366 A1* | 9/2008 | Telfer et al. | 709/224 |
| 2008/0298380 A1* | 12/2008 | Rittmeyer et al. | 370/412 |
| 2009/0070750 A9* | 3/2009 | Gu | 717/140 |

* cited by examiner

*Primary Examiner* — Mohamed Ibrahim
(74) *Attorney, Agent, or Firm* — Howard IP Law Goup, PC (57) ABSTRACT

According to some embodiments, first and second schedule patterns are determined. For example, a graphical user interface might be used to indicate the times, days, and/or weeks when information is to be transferred. A first transfer of information may be scheduled between remote devices in accordance with the first schedule pattern, and a second transfer may be scheduled in accordance with the second schedule pattern. Moreover, a third transfer of information between remote devices may be automatically scheduled in accordance with both the first and second schedule patterns.

25 Claims, 11 Drawing Sheets

DYNAMIC FILE TRANSFER SCHEDULING AND SERVER MESSAGING

BACKGROUND

An enterprise may need to periodically transfer information between remote devices. For example, a server in a human resources department may store electronic records associated with employees, including salary, work hour, and vacation information. In this case, the records may need to be sent from the human resources department to a payroll department on a weekly basis. Note that the number of records associated with such transfers may be relatively large (e.g., an enterprise may need to transfer thousands of electronic records each week).

Moreover, different types of transfers may need to occur according to different schedules. For example, payroll information might need to be transferred between two remote devices on a weekly basis while sales information should be transferred between two different devices at the close of each business day. Managing such schedules for many different types of transfers can be a time consuming and error prone process. Consider, for example, an enterprise that needs to transfer information from a device in the United States to a device in Japan on business days only when it is not a national holiday in either country. A list of appropriate days could be manually created, but such an approach may be impractical—especially when there are a relatively large number of different types of jobs (each needing to comply with different complex scheduling requirements). Moreover, if a new national holiday was introduced in Japan, each previously constructed schedule would need to be reviewed to determine if changes were required.

Also note that these periodic transfers of information may include data that is especially important to an enterprise (e.g., customer requests or billing information), and a transfer that fails to execute properly for any reason may cause undesirable delays and other complications for the enterprise.

SUMMARY OF THE INVENTION

According to some embodiments, first and second schedule patterns are determined. A first transfer of information between remote devices may then be scheduled in accordance with the first schedule pattern, and a second transfer may be scheduled in accordance with the second schedule pattern. Moreover, third transfer of information between remote devices may be scheduled in accordance with both the first and second schedule patterns.

Other embodiments include: means for determining a first schedule pattern; means for determining a second schedule pattern; means for automatically scheduling a first transfer of information between remote devices in accordance with the first schedule pattern; means for automatically scheduling a second transfer of information between remote devices in accordance with the second schedule pattern; and means for automatically scheduling a third transfer of information between remote devices in accordance with both the first and second schedule patterns.

In some embodiments, a communication device associated with an automated remote access file transfer system, platform, or engine exchanges information with remote devices. The information may be exchanged, for example, via public and/or proprietary communication networks.

A technical effect of some embodiments of the invention is an automated remote access file transfer. With this and other advantages and features that will become hereinafter apparent, a more complete understanding of the nature of the invention can be obtained by referring to the following detailed description and to the drawings appended hereto.

DETAILED DESCRIPTION

Figure 1:
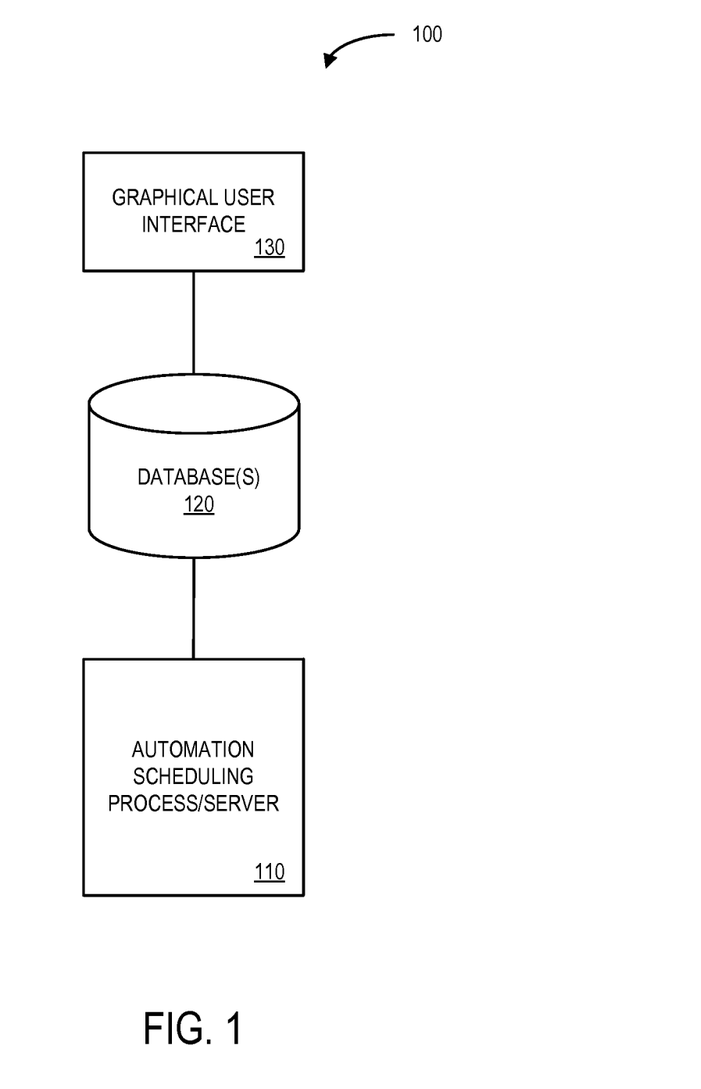
FIG. 1 is block diagram of a remote access file transfer system according to some embodiments of the present invention.

FIG. 1 is block diagram of remote access file transfer system 100 according to some embodiments of the present invention. The system 100 may, for example, facilitate an automated transfer of "files" between remote devices. As used herein, the term "files" may refer to electronic representations of information. By way of examples only, files might be associated with an insurance policy, event, or claim, payroll information, billing information, sales information, human resource information, medical information, or a legal proceeding (e.g., associated with a civil, criminal, or arbitration proceeding). Additionally note that the word "file" as used herein can refer to various types and formats of information, including text documents, spreadsheets, photographs, video images, and/or audio recordings. Moreover, as used herein the term "automated" indicates that at least some part of a step associated with a process or service is performed with little or no human intervention. In addition, the phrase "remote device" might refer to any apparatus or process that transmits or receives files in accordance with embodiments described herein. By way of examples only, a remote device may be associated with an enterprise server or a database farm.

The system 100 includes an automation scheduling process 110 (e.g., executing at a server). The automation scheduling process 110 may, according to some embodiments, arrange for the transfer of information, such as batches of files, between remote devices. For example, the automation scheduling process 110 might arrange for documents meeting a pre-determined criteria to be transferred from an enterprise accounting system to an enterprise payroll system each business day at 6:00 PM.

The automation scheduling process 110 may access information in one or more databases 120. The databases 120 may include, for example, scheduling information. According to some embodiments, the databases 120 include "scheduling patterns," such as sets of rules or instructions associated with schedules for a automated file transfer. For example, the databases 120 might include information indicating that a particular file (or files) should be transferred from a first device to a second device: on the 15$^{th}$ of every month, every Thursday, every January 1$^{st}$, every 10$^{th}$ week during a year, etc. Note that the scheduling information might also indicate a time of day when the information should be transferred (e.g., every Monday at 1:00 PM). As other examples, the databases 120 might include information about when information should not be transferred: on a weekend, on a U.S. federal holiday, etc.

The automation scheduling process 110 might access the databases 120 via a communication network. These devices (and any of the other devices described herein) could be associated with, for example, a server, a Personal Computer (PC), a mobile or laptop computer, or any other appropriate storage and/or communication device to exchange information via a web site and/or a communication network. As used herein, devices (including those associated with the automation scheduling process 110, the databases 120, and any other device described herein) may exchange information via any communication network, such as a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

The databases 120 are also accessible via a Graphical User Interface (GUI) 130. The GUI 130 might be used, for example, to dynamically display existing schedule patterns to a user (e.g., along with files that are associated with those patterns), to receive new schedule pattern definitions from a user, and/or to associate one or more schedule patterns with particular files, types of files, and/or remote devices. One example of a GUI 130 is described herein with respect to FIG. 3.

Although a single automation scheduling process 110, database 120, and GUI 130 are shown in FIG. 1, any number of such systems may be included. Moreover, various devices described herein might be combined according to embodiments of the present invention. For example, in some embodiments, the automation scheduling process 110, database 120, and/or GUI 130 might be co-located and/or may comprise a single apparatus.

Figure 2:
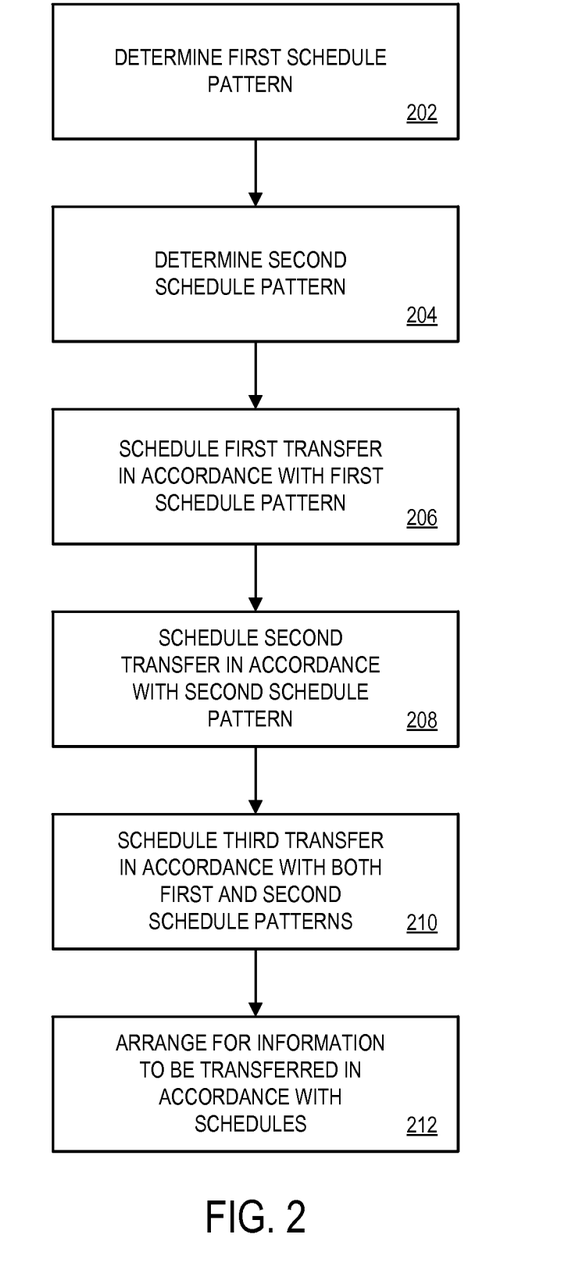
FIG. 2 illustrates a method according to some embodiments of the present invention.

FIG. 2 illustrates a method that might be performed, for example, by some or all of the elements of the system 100 described with respect to FIG. 1 according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a storage medium may store thereon instructions that when executed by a machine result in performance according to any of the embodiments described herein.

A first schedule pattern is determined at 202, and a second schedule pattern is determined at 204. The schedule patterns might be determined, for example, by retrieving pre-stored pattern information from a database. Note that a schedule pattern might be associated with a time of day (e.g. including a time zone of a device to send or receive information), a day of week, a day of month, and/or a week of year. Moreover a schedule pattern might be associated with holiday information and/or country information (e.g., listing Japanese national holidays). Also note that a schedule pattern might indicate when information should be transferred or be an exception indicating when information should not be transferred.

Figure 3:
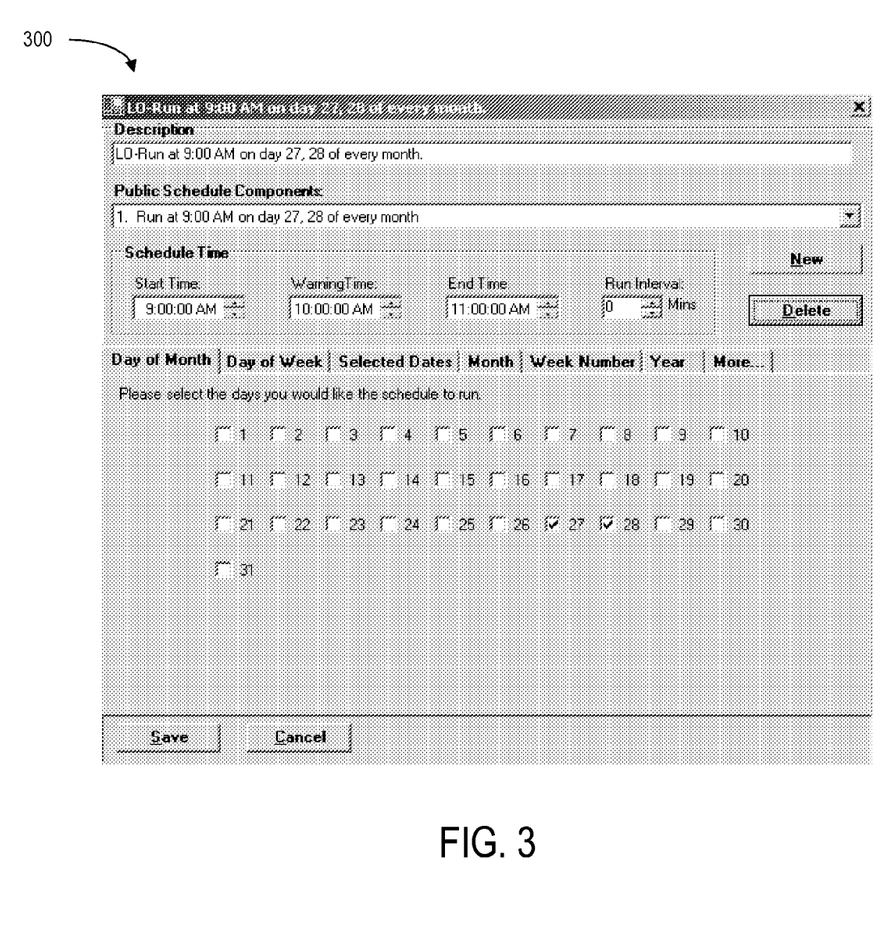
FIG. 3 illustrates a scheduling pattern display in accordance with some embodiments of the invention.

The patterns determined at 202 and 204 might be received via a GUI. For example, FIG. 3 illustrates a scheduling pattern display 300 in accordance with some embodiments of the invention. In this case, a user has defined the schedule pattern as being run on the 27$^{th}$ and 28$^{th}$ of each month (as illustrated by the boxes with check marks in FIG. 3). Note that, according to some embodiments, a schedule pattern might be designated as "public" (e.g., shared by multiple users) or "private" (e.g. available to specific users).

At 206, a first transfer of information is automatically scheduled between remote devices in accordance with the first schedule pattern. For example, it might be automatically arranged for a batch of records to be transmitted from a sales department device to a billing department device each Friday at 6:00 PM Eastern Standard Time (EST). Similarly, at 208, a second transfer of information is automatically scheduled between remote devices in accordance with the second schedule pattern. For example, it might be automatically arranged for claim documents that meet a pre-determined criteria (e.g., are more than 90 days old and are stored at a particular location) to be transferred on the first day of every month.

According to some embodiments, a third transfer of information between remote devices is automatically scheduled at 210 in accordance with both the first and second schedule patterns. That is, the rules associated with the two schedule patterns may be combined via a conditional combination. For example, two (or more) schedule patterns might be combined in accordance with a conditional rule and/or one or more Boolean logic operations (e.g., an AND operation, OR operation, and/or any other type of combination). Note that more than two schedule patterns might be combined. For example, a particular job might be defined as being: (i) run every business day, except holidays, at 8:00 AM, (ii) run every weekend day and holiday at 6:00 AM, and (iii) run on the last day of every month (including holidays) at 11:59 PM.

Once the schedules are assigned, the system may automatically transfer information at 212 in accordance with at least one of the automatic schedules. For example, the system might arrange for all files named *.doc to be copied from a particular folder at a first server into a remotely located database at 3:00 AM each business day.

According to some embodiments, jobs to be executed are placed in an execution queue, such as a First-In, First-Out (FIFO) queue. Moreover, multiple queues might be used in connection with a remote access file transfer system (e.g., a primary transfer queue and a lower-priority secondary transfer queue). In some cases, the system may determine if a first file associated with a scheduled transfer of information is ready (e.g., does the file currently exist in a particular location). If the first file is not ready, another file from a primary transfer queue might be worked on instead. Moreover, an indication of the first file (e.g., a job identifier) might be moved from the primary transfer queue to the secondary transfer queue. According to some embodiments, jobs to be executed may also be associated with a priority level indication (e.g., indicating a high, medium, or low priority that should be associated with a type of job), and the priority level indication may be used to schedule execution of jobs instead of, or in addition to, a primary transfer queue and/or a secondary transfer queue.

Thus, embodiments of the present invention may provide for multi-faceted scheduling of remote access file transfers without extensive code changes. For example, by simply changing a schedule pattern stored in a database (e.g., by a adding a new date to an exception schedule entitled "UK Bank Holidays"), multiple jobs may end up being automatically rescheduled as appropriate. Moreover, a single job can be efficiently associated with a schedule defined using several different pattern types.

Figure 4:
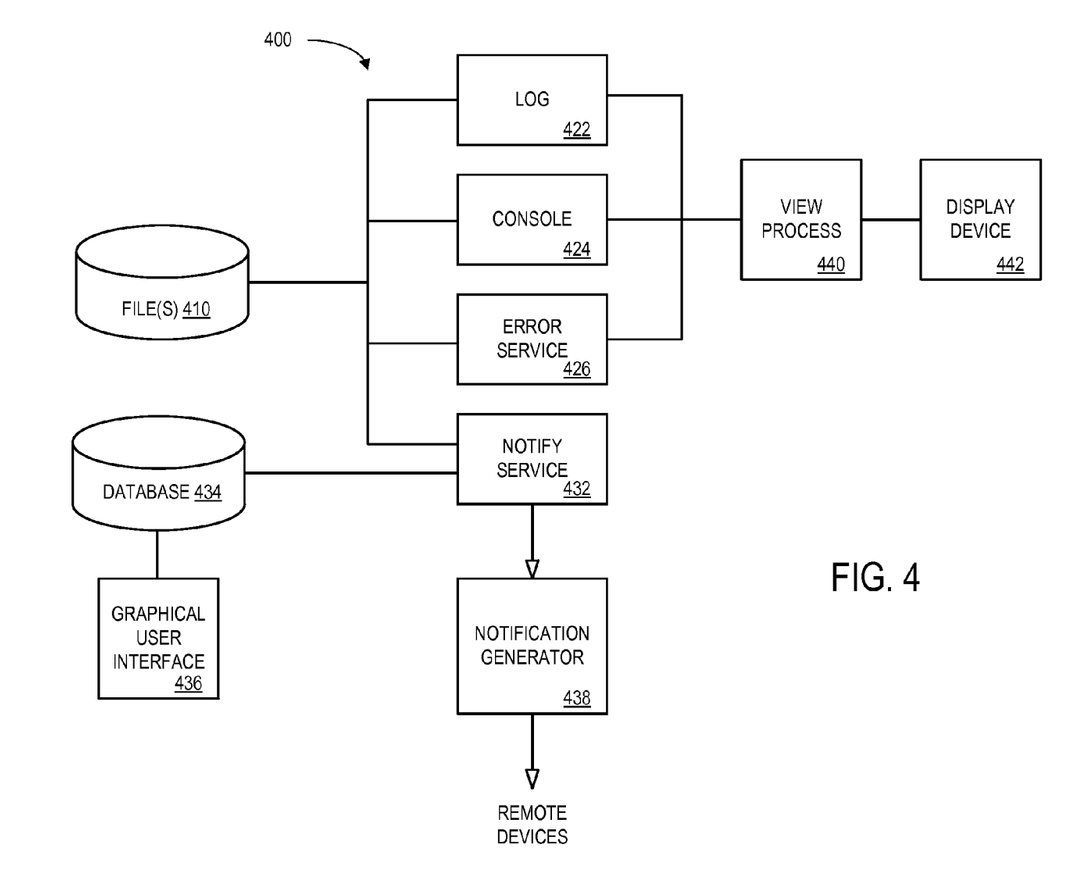
FIG. 4 is a messaging process flow in accordance with an exemplary embodiment of the invention.

According to some embodiments, one or more elements or steps are implemented by sending messages between devices and/or processes. Such an approach may, for example, facilitate efficient communication between a relative large number of processes (e.g., a message might be sent from a process to one or many destinations). FIG. 4 is a messaging process flow 400 in accordance with an exemplary embodiment of the invention.

As illustrated in FIG. 4, a message files database 410 may be provided. The message files database 410 may, for example, contain a list of messages and associated destinations. The messages might be referenced using, for example, a Remote Access File Transfer Identifier (RAFT ID) and, according to some embodiments, a destination associated with a RAFT ID can be dynamically changed by editing the appropriate file in the database 410.

The message files database 410 may provide information to other devices and/or processes, such as a log component 422. The log component 422 may, for example, log information associated with a status of a transfer of information. According to some embodiments, the logged information includes a Trace Identifier (Trace ID) that can span multiple messages. The message files database 410 may also provide information to a console component 424 and/or an error service 426 (e.g., a service that can detect and/or respond to errors in a remote access file transfer system). Moreover, a view process 440 may let an administrator access and/or dynamically adjust information about the log component 422, console component 424, and/or error service via a display device 442.

The message files database 410 may further provide information to a notify service 432 that helps inform users about the status of various remote access file transfer jobs. For example, a user might be notified when a job is successfully initiated or completed (or when a job cannot be completed for some reason). The notify service 432 may, for example, determine what type of message will be sent and how the message is to be handled.

According to some embodiments, information about where and when such notices should be sent are stored in a notification database 434. For example, the notification database might store a name, email address, telephone number, priority indication, and/or list of several parties that are to be associated with a particular type of notification. Moreover, according to some embodiments information in the notification database 434 may be dynamically changed by a user via a GUI 436. For example, the GUI 436 might let a user customize the destination (e.g. by listing one or more email addresses or groups of addresses), "subject line," body, and/or attachments of a notification message using one or more notification templates.

Based on the information in the notification database 434 and the message files database 410, a notify service 432 may transmit notification messages to one or more notification devices associated with a remote access file transfer via a notification generator 438. The notification devices might include, for example, a Personal Digital Assistant (PDA), an email account, a wireless telephone, and/or any other appropriate device.

Figure 5:
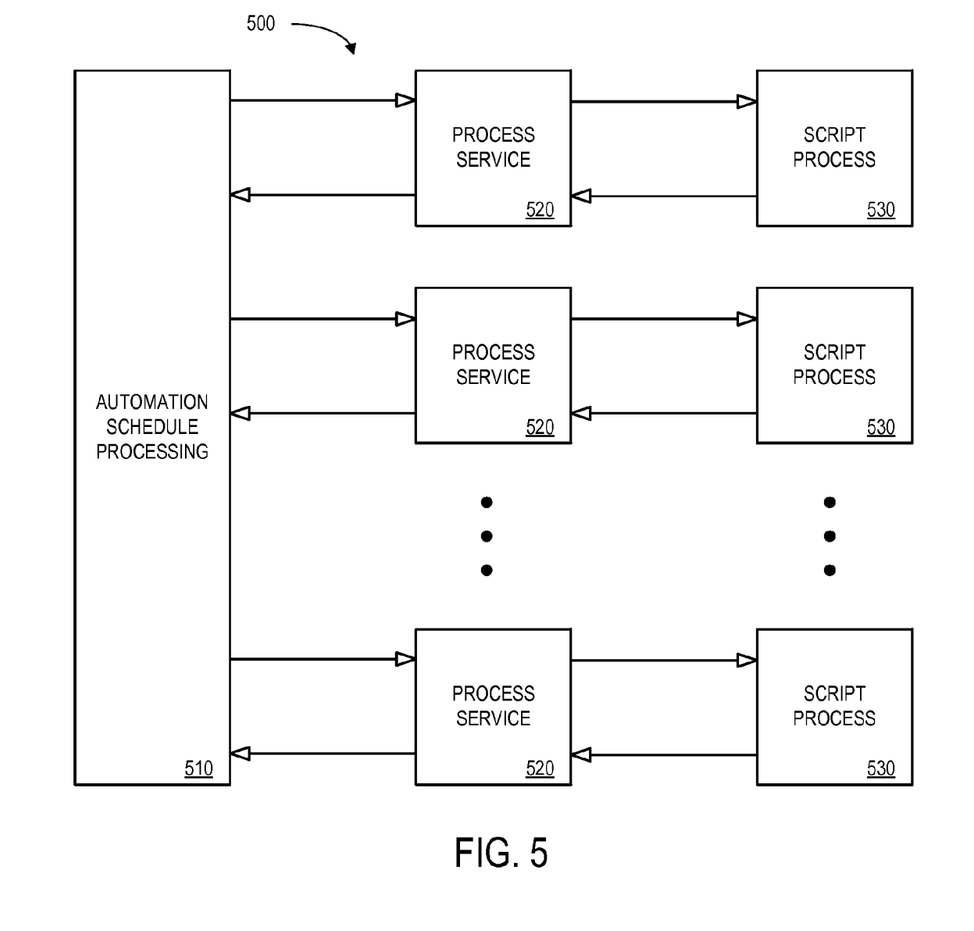
FIG. 5 illustrates message exchanges in accordance with an exemplary embodiment of the invention.

According to some embodiments, a remote access file transfer system initiates and executes the transfer of information between remote devices by sending messages and executing scripts. FIG. 5 illustrates message exchanges 500 in accordance with an exemplary embodiment of the invention. In this case, messages may be sent from an automation scheduling process 510 to a plurality of script processes 530 via a plurality of process services 520. A script process 530 may, for example, execute a number of actions associated with a particular job. According to some embodiments, a script process 530 may arrange for an encryption process to be executed in connection with an automated transfer of information (e.g. to encrypt and/or decrypt information associated with the job).

Thus, the automation scheduling process 510 may use messages to start many jobs which execute through many processes 520, 530 (e.g. which in turn may also generate many additional messages). Information about the relatively large number of messages that are exchanged may be stored, for example, in combined or independent log files. To help a user sort and/or search for information in such logs, a Trace ID associated with a particular job may be included in each message.

According to some embodiments, the message exchanges 500 are performed via Microsoft Message Queue (MSMQ) provided by MICROSOFT CORPORATION®. Such an approach may, for example, let the remote access file transfer system communicate with applications running at different times across heterogeneous networks as well as systems that may be temporarily offline. Moreover, the messaging can provide guaranteed delivery, efficient routing, security, and priority-based implementations for asynchronous and/or synchronous systems. In addition, message persistence may be arranged, addressing can be dynamically implemented, and delivery to multiple instances (across multiple servers) can be provided. According to some embodiments, each message includes an originating server name (indicating a server where the message came from) and an originating process name (indicating a process where message came from). Similarly, each message may include a destination server and process name. Messages may also include a message and job identifier (RAFT ID), user identifier, acknowledgement information (for a receiver to acknowledge receipt), a message type (to categorize the message), a Trace ID (e.g., unique identifier that could span multiple messages), and message text.

Figure 6:
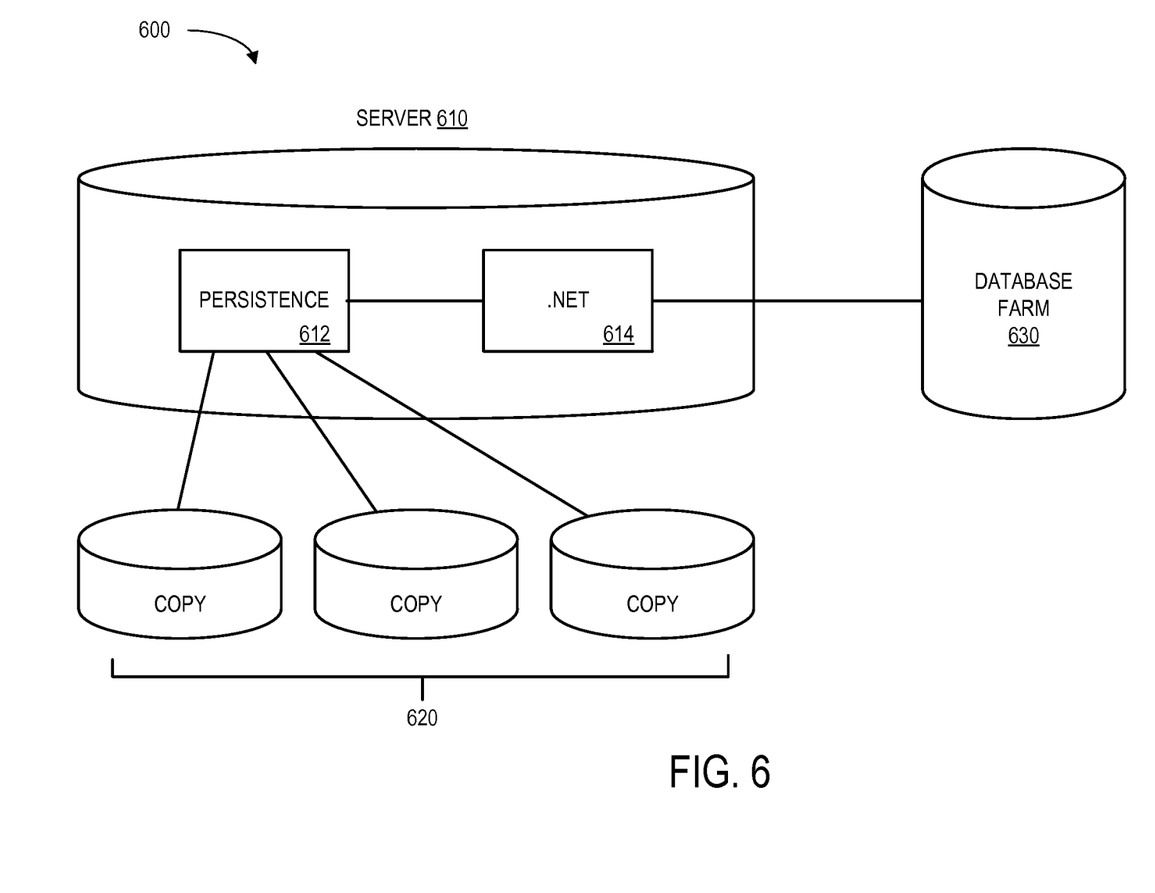
FIG. 6 is a block diagram of a persistence process in accordance with some embodiments.

To provide resilience and recovery abilities for a remote access file transfer system, a plurality of persistence copies may be stored in connection with information being transferred. For example, FIG. 6 is a block diagram of a persistence process system 600 in accordance with some embodiments. In this example, a server 610 exchanges information with persistence copies 620 and a database farm 630 providing a highly available software architecture with automated failover and dynamic disaster recovery (e.g., by supporting multiple disaster recover designations through environment classifications).

The server 610 may include a persistence process 612 and one or more remote access file transfer .net processes 614

(e.g., a scheduling process, logging process, and/or messaging process). The persistence process 612 may arrange for information associated with job transfers to be stored in the multiple persistence copies 620 and the data may be stored in a number of different places (e.g., different physical and/or geographic locations). Note that adding more destinations may increase the level of resiliency associated with the system 600. Moreover, the .net processes 614 may access information via the database farm 630, which may represent the authoritative source of data including RAFT ID information and associated scheduling information. Note that if a connection between the server 610 and database farm 630 is lost, information may still be processed until the connection is re-established. For example, information may still be processed using data stored in a persistence layer (e.g., the copies 620). Also note that if one of the copies 620 becomes unavailable for some reason, the system 600 may later bring that copy 620 up-to-date if it becomes available again.

Such an approach may provide resilience by allowing the system 600 to continue processing information even when a particular database is not available. Moreover, the approach may provide recovery abilities by letting the system 600 re-synchronize when an object is lost and later recovered.

Figure 7:
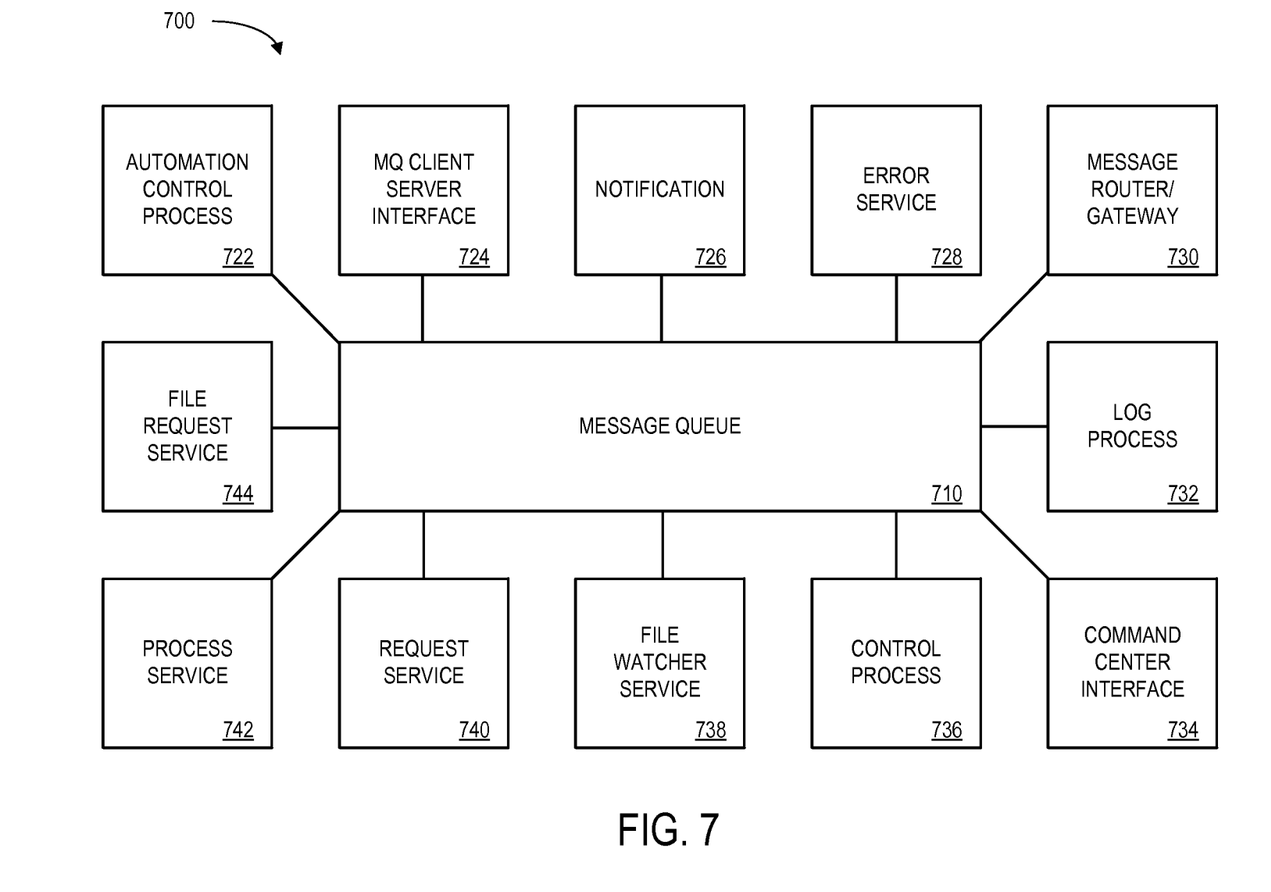
FIG. 7 illustrates a software architecture in accordance with an exemplary embodiment of the present invention.

FIG. 7 illustrates a software architecture 700 in accordance with an exemplary embodiment of the present invention. The architecture 700 may be implemented so as to help ensure reliability and flexibility of file transfers across an enterprise. According to some embodiments, one or more components of the architecture 700 are implemented using Visual Studio .net from MICROSOFT CORPORATION®, C++, Visual Basic, and/or Structured Query Language (SQL) database protocols for configuration and logging. Such an approach may, for example, provide relatively easy access to information in a single location, allow for central management of data, and/or provide for efficient maintenance of the architecture 700.

According to some embodiments, information is exchanged via a MSMQ message queue 710 to provide guaranteed message delivery, a scalable environment, workload distribution, intelligent error processing, relatively fast diagnosis, and/or enhanced system recovery. Note that the architecture may also be associated with other protocols, such as the Transmission Control Protocol/Internet Protocol (TCP/IP) and/or the MQ Series or similar message oriented middleware provided by IBM CORPORATION®.

Messages may be, for example, sent and/or received by an automation control process 722. The automation control process 722 may, for example, schedule the execution of transfer jobs, monitor the execution and completion of transfer jobs, and/or provide the status of transfer jobs. The automation control process 722 may be resilient and manage memory recovery during a process failure or application fail over (e.g., by persisting job information and scheduling to alternative locations to improve availability). Moreover, the automation control process 722 may allow for flexible scheduling by letting multiple schedules be used to define each transmission and may also provide extended event driven automation for a remote access file transfer system.

A Messaging Queue (MQ) client server interface 724 may act as a connection point for remote client programs using the message queue 710 as the communication interface. The MQ client server interface 724 may also let an operator view job information (e.g., associated with a job execution status), initiate remote access file transfer automation, provide client message queue creation, and handle system parameter requests.

A notification component 726 may arrange for users to receive email and/or pager notifications associated with the status of an automated transfer of information. For example, the manager of a human resources department may receive an email confirming that employee payroll files have been successfully transferred to an accounting department. The notification component 726 may also provide production support alerts, customer alerts, and/or custom tailored emails (e.g., by dynamically creating the subject line and/or body of an email message).

An error service 728 may help provide error recovery for the software architecture 700. For example, the error service 728 might reduce costly problem tickets by implementing error ticket logging (e.g., allowing for a central error ticket location and interface with corporate tools), error tracking management, persisting error tickets to files for disaster recovery, and/or persisting errors to backup queues for automatic recovery to database.

A message router 730 may allow for multiple instances of remote access file transfer .net processes on remote servers and/or route messages based on direct addressing for forwarding processes. The message router 730 may also return undeliverable messages and/or manage connectivity with multiple servers. According to some embodiments, a gateway may also be provided (e.g., to act as an interface to IBM's MQ Series message queues) Such a gateway might deliver data to message queues and/or servers using File Transfer Protocol (FTP) or to network access storage devices, provide event based delivery using file or message queue watchers, manage files or zip files (e.g., zip files that conform to a standard configuration such as a content descriptor file), and/or extract messages from message queues and deliver as files (either individually or concatenated).

A log process 732 may manage log messaging and tables and provide an automated archive capability (e.g., archiving based on the current month and/or year). The log process 732 may also provide access to transfer history information, let users view filtered real time execution of transfers, persist log messages to files for disaster recovery, and/or persist log messages to backup queues for automatic recovery to database.

A command center interface 734 may allow limited access to remote access file transfer .net functionality through a TCP/IP client. The command center interface 734 may also provide a secure interface into remote access file transfer .net processes, allowing a customer to either automate or manually initiate their transfer, and/or return status messages for the software architecture 700.

A control process 736 may be responsible for startup and/or shutdown procedures associated with the software architecture 700. The control process 736 may also monitor the stability of critical processes, provide auto-recovery of failed processes, and/or automatically arrange for inclusion of manually initiated processes. According to some embodiments, the control process 736 may be configurable to allow multiple instances of remote access file transfer .net processes on a single server. Note that control process 736 may be executed as a service or manually and can be configured for high availability and disaster recovery (e.g., to identify an alternate server and hardware resource for recovery, actively monitor an alternate server and hardware resource for instant failover, and/or to check for passive session inactivity before initiating failover).

A file watcher service 738 may provide a reliable method for delivering files to and from network shared storage. The file watcher service 738 may be event drive (e.g., not scheduled) and may initiate additional automation through a request service 740. According to some embodiments, the file watcher service 738 may persist a state of delivery for auto recovery during server failure and/or application failover.

A request service 740 may provide for the reliable execution of scripts initiated from an event message. According to some embodiments, execution may be thread based and the request service 740 may manage execution by maintaining state information, queuing data, and monitoring maximum concurrent usage. Similarly, a process service 742 may be provided to support legacy scripts and may be processed based. The process service 742 might, for example, manage execution by maintaining state information, be initiated by command line or by automation control process through an action, and/or be tightly integrated with the automation control process 722.

A file request service 744 may create files from event messages. The file request service 744 may, for example, use MQS gateway.request services for MQ message delivery (e.g., supporting open, write, and/or close request). The file request service 744 may also support header and trailer creation (e.g., either system or user defined) and use the request service 740 for delivery after the successful creation of a file.

Figure 8:
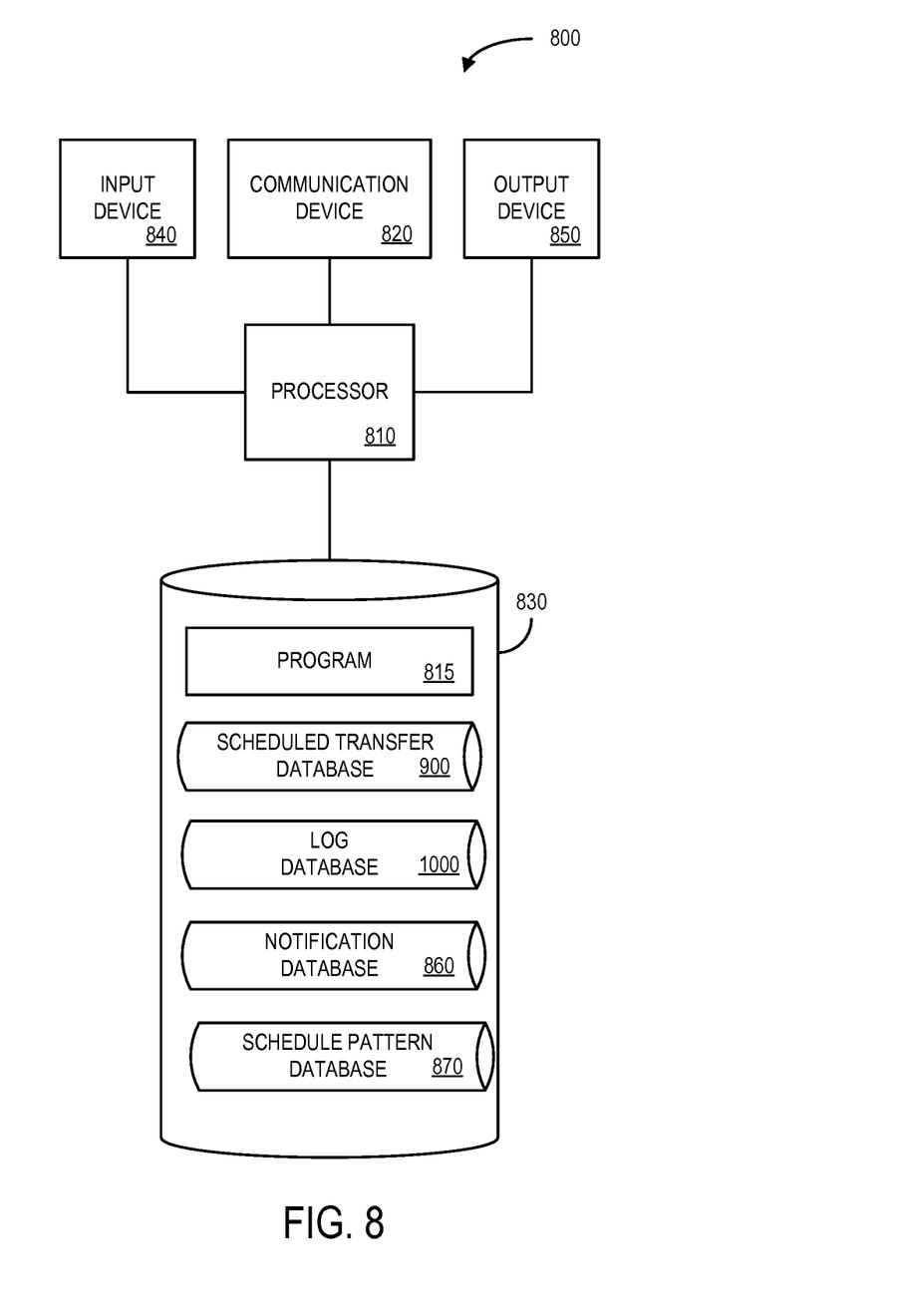
FIG. 8 is a block diagram of an automation control process apparatus in accordance with some embodiments of the present invention.

FIG. 8 is a block diagram of an automation control process apparatus 800 in accordance with some embodiments of the present invention. The apparatus 800 might, for example, comprise a platform or engine similar to the automation control process 722 illustrated in FIG. 7. The apparatus 800 comprises a processor 810, such as one or more INTEL® Pentium® processors, coupled to a communication device 820 configured to communicate via a communication network (not shown in FIG. 8). The communication device 820 may be used to exchange messages, for example, with one or more remote devices.

The processor 810 is also in communication with an input device 840. The input device 840 may comprise, for example, a keyboard, a mouse, or computer media reader. Such an input device 840 may be used, for example, to enter information about schedule patterns. The processor 810 is also in communication with an output device 850. The output device 850 may comprise, for example, a display screen or printer. Such an output device 850 may be used, for example, to provide reports and/or display information associate with schedule patterns and/or jobs that have been (or are to be) performed by a remote access file transfer system.

The processor 810 is also in communication with a storage device 830. The storage device 830 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 830 stores a program 815 for controlling the processor 810. The processor 810 performs instructions of the program 815, and thereby operates in accordance any embodiments of the present invention described herein. For example, the processor 810 may receive information indicating a first and second schedule pattern. The processor 810 may automatically schedule a first transfer of information (between remote devices) in accordance with the first schedule pattern and a second transfer in accordance with the second schedule pattern. Moreover, according to some embodiments, the processor 810 may automatically schedule a third transfer of information between remote devices in accordance with both the first and second schedule patterns. Note that the processor 810 or some other device may then initiate automated transfers of information in accordance with the schedules.

As used herein, information may be "received" by or "transmitted" to, for example: (i) the automation control process apparatus 800 from other devices; or (ii) a software application or module within the automation control process apparatus 800 from another software application, module, or any other source.

Figure 9:
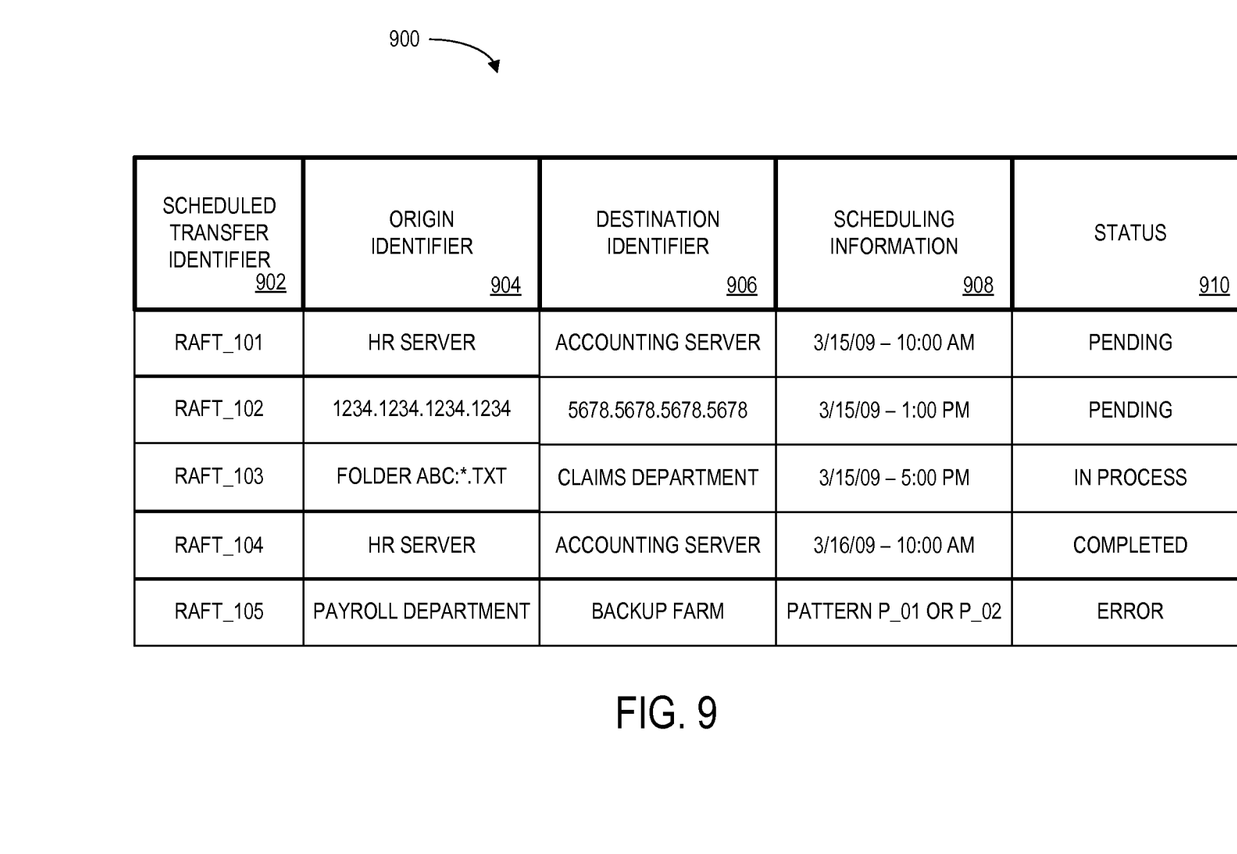
FIG. 9 is a tabular view of a portion of an scheduled transfer database in accordance with some embodiments of the present invention.
Figure 10:
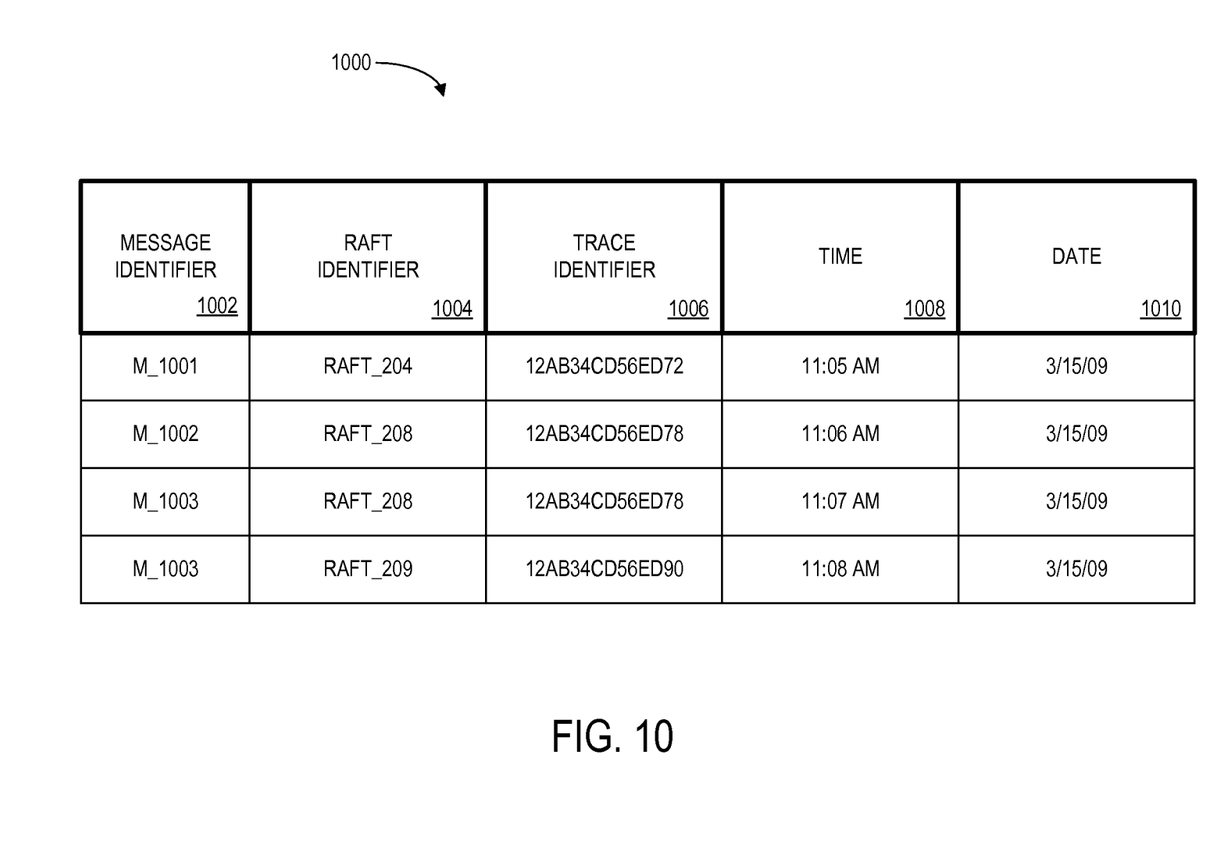
FIG. 10 is a tabular view of a portion of a log database in accordance with some embodiments of the present invention.

As shown in FIG. 8, the storage device 830 also stores: a schedule database 900 (described with respect to FIG. 9) and a log database 1000 (described with respect to FIG. 10). Examples of these databases that may be used in connection with the automation control process apparatus 800 will now be described in detail with respect to FIGS. 9 and 10.

The illustrations and accompanying descriptions of the databases presented herein are exemplary, and any number of other database arrangements could be employed besides those suggested by the figures. For example, a single remote access file transfer database with multiple tables might be employed. As other examples, customer configuration tables (including a file transfer identifier and associated schedule, customer information, and script process steps), a notification table 860 (including email or pager addresses along with a message subject header and text body), a schedule pattern database 870 (e.g., defining different types of job schedule patterns), an accounting table, and/or an error table might be associated with the apparatus 800.

FIG. 9 is a tabular view of a portion of an scheduled transfer database 900 in accordance with some embodiments of the present invention. The table includes entries identifying jobs associated with information to be transferred between remote devices. The table also defines fields 902, 904, 906, 908, 910 for each of the entries. The fields specify: a Remote Access File Transfer Identifier (RAFT ID) 902, an origin identifier 904, a destination identifier 906, schedule information 908, and a status 910. The information in the database 900 may be created and updated based on information received from users and/or a remote access file transfer system.

The scheduled transfer identifier or RAFT ID 902 may be, for example, an alphanumeric code associated with a set of files that are scheduled to be automatically transferred between remote devices. The origin identifier 904 may represent where the files to be transferred are to be found and the destination identifier 906 may represent where the files should be sent. The origin and destination identifiers 904, 906 might comprise, for example, physical locations, document names, network addresses, and/or any other information that can identify the appropriate storage areas. The scheduling information 908 indicates when the files should be transferred from the origin identifier 904 to the destination identifier 906. The scheduling information 908 might include, for example, one or more times, dates, and/or years. The scheduling information 908 might also comprise references to one or more pre-determined scheduling patterns (e.g., defined by a user via a GUI and/or stored in the schedule pattern database 870). For example, the scheduling information 908 might indicate that two patterns should be combined via a Boolean OR operation. The status 910 may indicate the current status of the job associated with the RAFT ID 902 (e.g., the job might be pending, in process, completed, or an error may have occurred).

Information about the status of a scheduled job might also be included in one or more log tables (e.g., tables that store jobs completed messages and steps completed messages, including transfer identifiers). For example, FIG. 10 is a tabular view of a portion of a log database 1000 in accordance with some embodiments of the present invention. The table includes entries identifying messages and/or actions that have occurred in a remote access file transfer system. The table also defines fields 1002, 1004, 1006, 1008, 1010 for each of the entries. The fields specify: a message identifier 1002, a Remote Access File Transfer Identifier (RAFT ID) 1004, a trace identifier 1006, a time 1008, and a date 1010. The information in the database 1000 may be created and updated automatically as messages are sent, processed, and/or received in connection a remote access file transfer system.

The message identifier 1002 may be, for example, an alphanumeric code associated with a message that has been processed (e.g., via the message queue 710 of FIG. 7). The scheduled transfer identifier or RAFT ID 1004 may be, for example, an alphanumeric code associated with a set of files that are scheduled to be automatically transferred between remote devices. The RAFT ID 1004 may be based on, or associated with, for example the RAFT ID 902 stored in the scheduled transfer database 900. The trace identifier 1006 may comprise, for example, a code that can be used to sort and/or search the message in the log database 1000. Note that according to some embodiments, a single trace identifier 1006 may span multiple RAFT IDs 1004 and/or message identifiers 1002. The time 1008 and date 1010 may indicate when the associated message was sent, received, and/or processed.

Thus, embodiments of the present invention may facilitate scheduling for a remote access file transfer system. Moreover, scheduling patterns can be defined as a schedule type (e.g., Monday, Tuesday, Wednesday, Thursday, Friday, Saturday, Sunday may represent day schedule types) and types may be created to make new types or patterns (e.g., grouping the day type may create a new schedule type of Week). In addition, a schedule can have any number of patterns that define a type. For example, a schedule might indicate that a job should be automatically run Monday thru Friday at 10:00 AM and Tuesday at 1:00 PM. Note that a schedule pattern could indicate when a job should not be executed (e.g., that a job should not be run on Thursday Nov. 29, 2007). Schedule information might be associated with a private group (e.g., unique for a single job) or a public group (e.g., used for multiple jobs). In this way, complex job schedules can be efficiently created and managed (e.g., because scheduling types and not static and allow for new additions).

Moreover, embodiments may provide resiliency for the remote access file transfer system. For example, a persistence layer lets a memory object be defined and saved to multiple physical locations. Moreover, the copies in the persistence layer may be synchronized to ensure recoverability after system failure. Note that a scheduling database, providing an authoritative source for configurations and scheduling, may be farm based and/or network attached therefore availability of the database may be interrupted. According to some embodiments, such an interruption will not result in application failures and/or any failures that do occur may be recoverable. For example, all configurations and schedules may be persisted to reliable disk storage and used for execution. Changes made to the source may be automatically synchronized with the persisted files on disk. Any database failure may therefore cause little or no risk to production execution (e.g., any loss of persisted files would automatically be recreated to synchronize with the source database). As a result, the remote access file transfer system may be able to continue with operations with minimal interruption even when enterprise services are unavailable.

In addition, embodiments may be implemented using an open messaging architecture (allowing for communications across multiple application processes as well as client/user access). The dynamic integration of applications and clients may be provided without reconfiguration and an application may remain active while integrating new features as processes. Further, all messages may use the same or similar architecture (e.g., as in logging, transactions and commands), and message routing may be configurable, able to span across multiple systems, discover destination and return locations, and provide relatively unlimited origination and destination points. As a result, embodiments may provide the ability to enhance an application with little or no interruption and/or to grow horizontally while continuing to share same tools.

Figure 11:
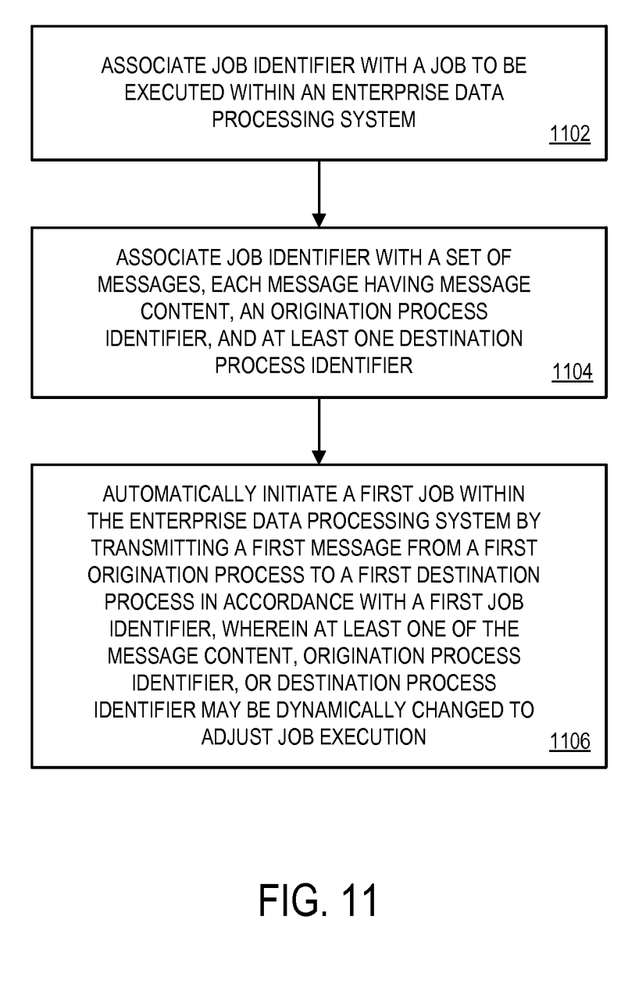
FIG. 11 illustrates a messaging method according to some embodiments of the present invention.

Note that embodiments of the present invention may be associated with systems other than a remote access file transfer system. For example, FIG. 11 illustrates a messaging method according to some embodiments of the present invention. In this case, a job identifier (e.g., such as the RAFT ID described herein) may be associated with a job to be executed within an enterprise data processing system at 1102. At 1104, the job identifier may also be associated with a set of messages, each message having message content, an origination process identifier, and at least one destination process identifier.

At 1106, a first job may be automatically initiated within the enterprise data processing system by transmitting a first message from a first origination process to a first destination process in accordance with a first job identifier, wherein at least one of the message content, origination process identifier, or destination process identifier may be dynamically changed to adjust job execution. Note that a message may be associated with, for example, an automation scheduling process, a process service, and/or a script process such as those described in connection with to FIG. 5. Moreover, a message may be associated with elements such as those described with respect to FIG. 7, including a message queue client server interface, a remote access file transfer request service, a file request service, a message queue client server interface, a notification service, a message queue gateway, an error service, a process service, a message router, a log process, a control process, a command center interface, a file watcher service, and/or a message queue.

Such an approach may, for example, provide for the efficient definition of new types of jobs to be executed and/or let a user dynamically change existing types of jobs (e.g., without needing to modify a substantial amount of code associated with the various processes of the enterprise system). According to some embodiments, log information associated with execution of the first job may also be stored, searched, and/or displayed to a user. Moreover, the log information may include a trace identifier (e.g., a Trace ID) associated with a plurality of messages or a plurality of processes.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, not that any number of other configurations may be provided in accordance with embodiments of the present invention (e.g., some of the information associated with the databases described herein may be combined or stored in external systems). Moreover, although examples of specific types of file transfers have been used, embodiments of the present invention could be used with other types of electronic information. For example, data associated with a financial services enterprise (e.g., banking or trading information) might be handled in accordance with any of the embodiments described herein.

Applicants have discovered that embodiments described herein may be particularly useful in connection with highly complex file transfer arrangements. For example, embodiments may be beneficially applied with respect to the complicated schedules, and substantial amounts of information, often associated insurance and/or financial services information (e.g., tens of thousands of important files may need to be frequently moved or copied in accordance with a large number of international calendars).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A computer-implemented remote access file transfer method, comprising:
    determining a first file transfer schedule pattern for a first file transfer including a source and destination for the first file transfer;
    determining a second file transfer schedule pattern for a second file transfer including a source and destination for the second file transfer;
    automatically scheduling the first file transfer between the source and destination in accordance with the first file transfer schedule pattern;
    automatically scheduling the second file transfer between the source and destination in accordance with the second file transfer schedule pattern; and
    automatically scheduling a third file transfer between a source and a destination, wherein the third file transfer has a file transfer schedule pattern in accordance with a conditional combination of the first and second file transfer schedule patterns.

2. The method of claim 1, further comprising initiating at least one file transfer in accordance with the schedule patterns.

3. The method of claim 2, further comprising storing a persistence copy with at least one of the file transfers.

4. The method of claim 2, wherein the first file transfer is associated with a primary transfer queue and the second file transfer is associated with a secondary transfer queue.

5. The method of claim 4, further comprising:
    before the transferring, determining whether a first file associated with the first file transfer is ready and when the first file is not ready, (i) transferring another file associated with another file transfer from the primary transfer queue and (ii) moving an indication of the first file from the primary transfer queue to the secondary transfer queue.

6. The method of claim 1, wherein a schedule pattern is associated with at least one of: (i) a time of day, (ii) a day of week, (iii) a day of month, (iv) a week of year, (v) holiday information, (vi) country information, and (vii) a time zone of a device to send or receive information.

7. The method of claim 1, wherein a schedule pattern indicates at least one of: (i) when a file should be transferred, or (ii) when a file should not be transferred.

8. The method of claim 1, further comprising sending a notification message indicating a status of each of the file transfers.

9. The method of claim 1, further comprising logging information associated with a status of each of the file transfers wherein the logged information includes a trace identifier.

10. The method of claim 1, wherein determining the first schedule pattern and the second schedule pattern is performed via a graphical user interface.

11. The method of claim 1, wherein the file transfers are performed in accordance with messages sent from an automation scheduling process to a plurality of script processes via a plurality of process services.

12. The method of claim 1, wherein one of the first file transfer, second file transfer, and third file transfer is associated with an encryption process.

13. The method of claim 1, wherein at least one of the file transfers comprises financial services information.

14. The computer-implemented remote access file transfer method of claim 1, wherein the conditional combination is a NOT operation which causes scheduling of the third file transfer according to a schedule that is not the same as either the first schedule pattern or the second schedule pattern.

15. A non-transitory computer-readable medium storing instructions adapted to be executed by a processor to perform a remote access file transfer method, said method comprising:
    receiving a request to schedule a first file transfer by selecting a first file transfer schedule pattern input via a graphical user interface, the first file transfer schedule pattern selected from among a set of available file transfer schedule patterns, the request including information identifying a source and a destination of the first file transfer;
    receiving a request to schedule a second file transfer by selecting a second file transfer schedule pattern input via a graphical user interface, the second the transfer schedule pattern selected from among a set of available file transfer schedule patterns, the request including information identifying a source and a destination of the second file transfer;
    automatically scheduling the first file transfer between the source and the destination of the first file transfer in accordance with the first file transfer schedule pattern;
    automatically scheduling the second file transfer between the source and the destination of the second file transfer in accordance with the second file transfer schedule pattern; and
    automatically scheduling a third file transfer between a source and a destination of a third file transfer, wherein the third file transfer has a file transfer schedule pattern in accordance with a conditional combination of the first file transfer schedule pattern and the second file transfer schedule pattern.

16. The non-transitory computer-readable medium of claim 15, wherein the conditional combination is associated with at least one of a combination rule or a Boolean operation.

17. The non-transitory computer-readable medium of claim 15, wherein a schedule pattern indicates when a file should be transferred in connection with at least one of: (i) a time of day, (ii) a day of week, (iii) a day of month, (iv) a week of year, (v) holiday information, (vi) country information, or (vii) a time zone of a device to send or receive information.

18. The non-transitory computer-readable medium of claim 15, wherein the method further comprises:
    sending an electronic notification message to a plurality of user devices indicating a status of a file transfer; and
    logging information associated with a status of a file transfer, wherein the logged information includes a trace identifier.

19. The non-transitory computer-readable medium of claim 15, wherein the method further comprises:
    transferring a file in accordance with at least one of the automatic schedules, wherein the first file transfer is associated with a primary transfer queue and the second file transfer is associated with a secondary transfer queue; and before the transferring, determining that a first file associated with the first file transfer is not ready and, (i) transferring another file from the primary transfer queue and (ii) moving an indication of the first file from the primary transfer queue to the secondary transfer queue.

20. The non-transitory computer-readable medium of claim 15, wherein the conditional combination is a NOT operation which causes scheduling of the third file transfer according to a schedule that is not the same as either the first schedule pattern or the second schedule pattern.

21. An apparatus to provide an automation control process for a remote access file transfer system, comprising:

a communication device to receive and transmit message information via a communication network;

a processor coupled to the communication device; and a storage device in communication with the processor and storing instructions adapted to be executed by the processor to:

receive a first file transfer schedule pattern for a first file transfer including a source and destination for the first file transfer, receive a second file transfer schedule pattern for a second file transfer including a source and destination for the second file transfer, automatically schedule the first file transfer between the source and destination in accordance with the first file transfer schedule pattern, automatically schedule the second file transfer between the source and destination in accordance with the second file transfer schedule pattern, automatically schedule a third file transfer between a source and a destination, wherein the third file transfer has a file transfer schedule pattern in accordance with a conditional combination of the first file transfer schedule pattern and the second file transfer schedule pattern; and initiate file transfers in accordance with the automatic schedules.

22. The apparatus of claim 21, wherein the processor is further adapted to:

determine a change to the first schedule pattern, and automatically adjust the first file transfer and third file transfer without adjusting the second file transfer.

23. The apparatus of claim 21, wherein the communication device is configured to exchange message information with at least one of: (i) a message queue client server interface, (ii) a remote access file transfer request service, (iii) a file request service, (iv) a message queue client server interface, (v) a notification service, (vi) a message queue gateway, (vii) an error service, (viii) a process service, (ix) a message router, (x) a log process, (xi) a control process, (xii) a command center interface, (xiii) a file watcher service, (xiv) a message queue, or (xv) another automation control process for the remote access file transfer system.

24. The apparatus of claim 21, wherein at least one memory object defined to a persistence layer of the remote access file transfer system is saved to multiple physical locations.

25. The apparatus of claim 21, wherein the conditional combination is a NOT operation which causes scheduling of the third file transfer according to a schedule that is not the same as either the first schedule pattern or the second schedule pattern.

\* \* \* \* \*